(12) United States Patent
Brune

(10) Patent No.: US 9,766,355 B2
(45) Date of Patent: Sep. 19, 2017

(54) USE OF VECTOR ROTATIONAL MEASUREMENTS AND VECTOR PRESSURE GRADIENT MEASUREMENTS TO ENHANCE SPATIAL SAMPLING OF DUAL-SENSOR WATER BOTTOM SEISMIC DATA

(71) Applicant: Robert H. Brune, Evergreen, CO (US)

(72) Inventor: Robert H. Brune, Evergreen, CO (US)

(*) Notice: Subject to any disclaimer, the term of this patent is extended or adjusted under 35 U.S.C. 154(b) by 540 days.

(21) Appl. No.: 14/271,976

(22) Filed: May 7, 2014

(65) Prior Publication Data
US 2014/0336939 A1 Nov. 13, 2014

Related U.S. Application Data

(60) Provisional application No. 61/821,360, filed on May 9, 2013.

(51) Int. Cl.
*G01V 1/00* (2006.01)
*G01V 1/18* (2006.01)
(Continued)

(52) U.S. Cl.
CPC .............. *G01V 1/189* (2013.01); *G01V 1/201* (2013.01); *G01V 1/3808* (2013.01); *G01V 2210/57* (2013.01)

(58) Field of Classification Search
CPC .......... G01N 2201/12; G01N 21/3577; G01N 21/4795; G01V 1/364; G01V 1/189; G01V 1/201; G01V 1/3808; G01V 2210/57
See application file for complete search history.

(56) References Cited

U.S. PATENT DOCUMENTS 6,681,887 B1 * 1/2004 Kragh .................. G01V 1/38
181/110
7,295,494 B2 11/2007 Meier
(Continued)

FOREIGN PATENT DOCUMENTS

WO WO 2012/015520 2/2012
WO WO 2012/037292 3/2012

OTHER PUBLICATIONS

Aki, K., and Richards, P., 2002, Quantitative Seismology, University Science Books, p. 128 ff., pp. 184-185.
(Continued)

*Primary Examiner* — Elias Desta
(74) *Attorney, Agent, or Firm* — Michael Reilly LLC

(57) ABSTRACT

Disclosed herein are various embodiments of a method and apparatus to enhance spatial sampling in all nominally horizontal directions for Dual-Sensor seismic data at the bottom of a body of water such as the ocean. The sensor apparatus on the water bottom is comprised of sensing elements for linear particle motion, for rotational motion, for pressure measurement, for pressure gradients, and for static orientation. Stress and wavefield conditions known at the water bottom allow numerical calculations that yield enhanced spatial sampling of pressure and nominally vertical linear particle motion, up to double the conventional (based on physical sensor locations) Nyquist spatial frequency in two nominally horizontal independent directions. The method and apparatus have a wide range of application in Ocean Bottom Seismic 3D, 4D, and Permanent Reservoir Monitoring surveys, and other marine seismic surveys, in oil and gas exploration and production.

14 Claims, 4 Drawing Sheets

(51) Int. Cl.
*G01V 1/20* (2006.01)
*G01V 1/38* (2006.01)

(56) References Cited

U.S. PATENT DOCUMENTS

| | | |
|---|---|---|
| 7,516,660 B2 | 4/2009 | Kozlov et al. |
| 8,024,971 B2 | 9/2011 | Kozlov et al. |
| 8,960,780 B2 * | 2/2015 | Nydam ................ B62D 25/025 296/187.12 |
| 9,494,701 B2 | 11/2016 | Brune |
| 2009/0040871 A1 | 2/2009 | Morley |
| 2010/0195439 A1 | 8/2010 | Muyzert |
| 2012/0113748 A1 | 5/2012 | Brune |

OTHER PUBLICATIONS

Lee, W., et. al., eds., 2009, Rotational Seismology and Engineering Applications, Bull. Seismological Society of America, vol. 99, No. 2B, supplement, May 2009.
Bracewell, R., 2000, The Fourier Transform and its Applications, McGraw-Hill, pp. 230-232.
Applied_Physical_Sciences_Underwater_Acoustic_Transducers.pdf.
Entec_R-1_data_new.pdf.
Fairfieldnodal_z700-overview.pdf.
Geospace_ocean-bottom-recorder.pdf.
Seabed_Acquisition_Services_Intermediate_Depth_&_Deepwater.pdf.
In re Taner, 681 F.2d 787, 214 USPQ 678 (CCPA1982).
In re Sherwood, 613 F.2d 809, 204 U.S.P.Q. 537 (CCPA 1980).
In re Schrader, 22 F. 3d 290, 30 USPQ 2d 1445, (1994).

\* cited by examiner

USE OF VECTOR ROTATIONAL MEASUREMENTS AND VECTOR PRESSURE GRADIENT MEASUREMENTS TO ENHANCE SPATIAL SAMPLING OF DUAL-SENSOR WATER BOTTOM SEISMIC DATA

CROSS REFERENCE TO RELATED APPLICATIONS

This application claims the benefit under 35 USC §119(e) of U.S. Provisional Patent Application No. 61/821,360 filed on May 9, 2013, the disclosure of which is incorporated herein by reference.

FIELD

Various embodiments described herein relate to the art of seismic surveying for the exploration and production of petroleum reservoirs, and more specifically to the joint use of multiple scalar, linear, gradient, and rotational sensors on a water bottom to enhance the spatial sampling of Dual-Sensor seismic surveys.

BACKGROUND

There is a long term trend in seismic reflection surveying for oil and gas exploration and production to utilize sensing elements, commonly known as geophones, at decreasing spatial sample intervals. There is a continuing need for economical ability to measure seismic wavefields at finer spatial sampling. The need for economical and efficient acquisition of seismic data is particularly significant for surveys acquired on the bottom of a body of water such as the ocean. There is a need for finer spatial sampling to improve the imaging of the geologic subsurface. Also there are particular modes of seismic noise and interfering signals on the water bottom that are better ameliorated with finer spatial sampling of the seismic wavefields.

Ocean Bottom Seismic (OBS) surveys are a well-established technology. This technology encompasses Ocean Bottom Cable (OBC), and Ocean Bottom Node surveys (OBN). It is common in OBS surveys to record and analyze so-called Dual-Sensor data consisting of a scalar pressure measurement, and an effectively co-located vector component measurement of vertical particle motion, such as particle velocity or acceleration. Dual-Sensor data will be understood here to mean a pressure (P) measurement, and a co-located nominally vertical (i.e., Z-Cartesian axis) particle motion measurement. Said Dual-Sensor data is sometimes referred to as P-Z data. There is a common practice in Ocean Bottom Seismic to utilize Dual-Sensor data to separate up-going and down-going seismic waves to remove multiples and for other purposes in data processing and analysis.

There is also recognition that measurements of vertical pressure gradient may be used in conjunction with measurements of pressure to separate up-going and down-going seismic waves.

There are Ocean Bottom Nodes available for recording seismic data on the water bottom. These are commercially offered by, for example, Fairfield, Oyo-Geospace, Seabed Geosolutions, and Fairfield Nodal.

There are Ocean Bottom Cables available for recording seismic data on the water bottom. These are commercially offered by, for example, Sercel and Ion Geophysical.

Marine seismic surveys are commonly recorded by utilizing pressure sensitive hydrophones. Hydrophones are widely used in towed streamer surveys. There is also an emerging commercial technology of utilizing pressure gradient measurements in towed streamers to enhance the spatial sampling of the pressure seismic wavefields. See, for example, U.S. Patent Application No. 2009/0040871 to Morley entitled "Wide Tow Enabled by Multicomponent Marine Seismic Cable".

There is a well established technology for measurement of the linear particle motion of seismic wavefields in the earth. Many commercial sensors exist to measure particle velocity or particle acceleration along one, or up to three, linear axes, utilizing various physical concepts to accomplish the measurements. It is most common to utilize measurements of the vertical particle motion. On the water bottom linear particle motion sensors are commonly deployed, typically along with pressure sensing hydrophones, in Ocean Bottom Cables or in Ocean Bottom Nodes.

There is a common practice in multi-component seismic to numerically rotate the components to different spatial orientations. For example, components recorded by sensors in arbitrary but known orientations may be rotated to a coordinate system of North, East, and Vertical; or they may be rotated to a coordinate system with one axis perpendicular to a local reference plane that is a smooth approximation of the water bottom.

There is an evolving commercial technology for measurement of the rotational particle motion of seismic wavefields in the earth. See, for example, U.S. Pat. No. 7,516,660 to Kozlov entitled "Convective Accelerometer" and U.S. Pat. No. 8,024,971 to Kozlov entitled "Convective Accelerometer". This includes sensors such as those commercially offered by, for example, MetTech (model Metr-3), Eentec (models R-1 and R-2), and Applied Technology Associates.

The utility of rotational seismic measurements is appreciated in earthquake and regional crustal seismology, as discussed, for example, in Lee, W., et. al., eds., 2009, Rotational Seismology and Engineering Applications, Bull. Seismological Society of America, vol. 99, no. 2B, supplement, May, 2009. Seismic rotational motion is commonly understood to be the vector curl of the infinitesimal displacement field. The existing rotational sensors are understood to measure the components of this vector curl.

There is an evolving commercial technology for measurement of the linear components of the spatial gradient of pressure. This includes so-called vector hydrophones such as those commercially offered by, for example, Applied Physical Sciences and BenthoWave. Other pressure gradient measurement technology is disclosed in U.S. Pat. No. 7,295,494 to Meier entitled "Diamagnetic Current Response Transducer for Sensing Pressure Gradient in a Fluid Medium". Spatial gradients may also be measured as differences between properly calibrated hydrophones that are deployed in an appropriate geometric array. Applications are discussed in disclosures such as International Patent Application No. WO 2012/015520 to Meier entitled "Seismic Acquisition Method for Mode Separation".

The significant effect of the water bottom on stress fields, strain fields, and seismic wave fields is widely understood. These concepts are described, for example, in Aki, K., and Richards, P., 2002, Quantitative Seismology, University Science Books, p. 128 ff., pp. 184-185. The shear modulus of water is commonly understood to be effectively zero for seismic wave propagation. The shear stress components commonly referred to as $\sigma_{xz}$ and $\sigma_{yz}$, involving the nominal vertical direction z, normal to the water bottom for a nominally horizontal water bottom, have zero value at the water bottom. For significant variations of the water bottom from a horizontal orientation, measured data may be numerically rotated to an orientation with components perpendicular and parallel to a reference plane that appropriately approximates the water bottom.

In the technical field of sampled data analysis, there is a well established technology for enhanced sampling rate by utilizing the sampling of the wavefield in conjunction with the spatial gradient of the wavefield being sampled. This technology is extensible to multiple spatial dimensions. This technology may be implemented by various algorithms that may include ability to handle irregular sampling, and the ability to optimally handle the effects of noise in the data. Persons having ordinary skill in the art will appreciate that there are many algorithms that may be employed to reconstruct spatial sampling. One widely known reference for the fundamental concept of Ordinate and Slope Sampling is Bracewell, R., 2000, The Fourier Transform and its Applications, McGraw-Hill, pp. 230-232. Other known algorithms may be utilized to deal with effects such as irregular sampling, or the effects of noise in the data.

There is technology to utilize rotational sensors in conjunction with vertical linear particle motion sensors to enhance the spatial sampling of that single vertical linear component of motion for a seismic wavefield. For example, see U.S. Patent Publication No. 2012/0113748 to Brune entitled "Method to Improve Spatial Sampling of Vertical Motion of Seismic Wavefields on the Water Bottom by Utilizing Horizontal Rotational Motion and Vertical Motion Sensors" and also International Patent Publication No. 2012/037292 A1 to Brune entitled "Method to Improve Spatial Sampling of Vertical Motion of Seismic Wavefields on the Free Surface of the Earth by Utilizing Horizontal Rotational Motion and Vertical Motion Sensors".

SUMMARY

In one embodiment there is provided a method for enhancing the two-dimensional horizontal spatial sampling of dual sensor ocean bottom seismic data on a reference surface, comprising: positioning at a plurality of locations on the ocean bottom dual sensors for measuring pressure, linear particle motion in a nominal vertical direction, pressure gradients in two independent nominally horizontal directions, and rotation around two independent nominally horizontal axes; measuring a static orientation of each dual sensor as an azimuthal angle and tilt around two horizontal axes; measuring linear particle motions along three independent linear axes; measuring rotational motions around three independent axes; measuring pressure, and measuring pressure gradients along three independent axes; numerically rotating in space the linear particle motions, the rotational motions and the pressure gradients to a new set of axes perpendicular and parallel to the reference surface by use of the static orientation measurements; computationally reconstructing the pressure at intermediate spatial locations on the reference surface by transforming the pressure measurements and the rotated pressure gradients that are parallel to the reference surface, the measurements being made at the sensor locations, to pressure values at a spatial sample spacing of approximately half the physical spacing of the sensors in any two independent directions parallel to the reference surface; computationally reconstructing the linear particle motion perpendicular to the reference surface at intermediate spatial locations on the reference surface using sample ordinate values and spatial gradient slopes by transforming the statically rotated linear particle motion measurements, and by transforming the statically rotated rotational motion measurements that are parallel to the reference surface, the measurements being made at the sensor locations, whereby the effective spatial sample spacing of the linear particle motion perpendicular to the reference surface is at a spatial sample spacing of approximately half the physical spacing of the sensors in any two independent directions parallel to the reference surface and collecting or obtaining at least one data field record wherein the effective spatial sampling is approximately half the physical spacing of the sensors in at least one horizontal direction.

In another embodiment there is provided An ocean bottom seismic sensor apparatus to enhance the two-dimensional horizontal spatial sampling of dual-sensor ocean bottom seismic data comprising: dual sensors positioned at a plurality of locations on the ocean bottom, the sensors being capable of measuring measuring linear particle motion in a nominal vertical direction, and rotation around two independent nominally horizontal axes to yield horizontal spatial gradients of the vertical particle motion; the sensors further being capable of measuring pressure, and horizontal pressure gradients in two independent nominally horizontal directions; a means for computationally reconstructing the pressure and vertical particle velocity wavefields at intermediate horizontal locations by transforming the pressure and vertical particle velocity measurements made at the sensor locations using sample ordinate values and spatial gradient slopes, to pressure and vertical particle velocity measurements at a spatial sample spacing of approximately half the physical spacing of the sensors in any two horizontal directions and a means for collecting or obtaining at least one data field record wherein the effective spatial sampling is half the physical spacing of the sensors in at least one horizontal direction.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
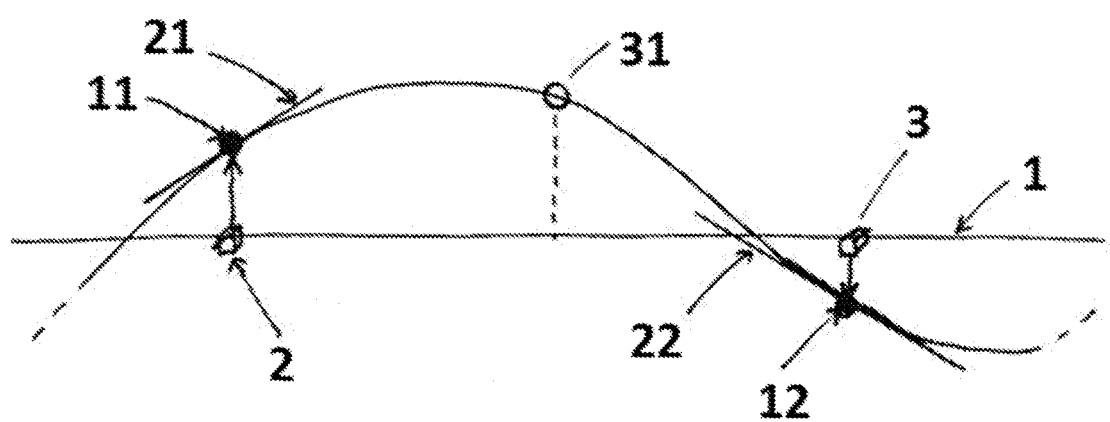
FIG. 1 is a diagrammatic representation of the enhanced spatial sampling signal reconstruction utilizing Slope as well as Ordinate measurements of the wavefields of interest.

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes and devices and systems finding application in the various embodiments described herein are not disclosed in detail. Persons having ordinary skill in the art will recognize that there may be many implementation-specific details that are not described here, but that would be considered part of a routine undertaking to implement the inventive concepts of the present invention.

Referring now to the drawings, embodiments of the present invention will be described. Several embodiments of the present invention are discussed below. The appended drawings illustrate only typical embodiments of the present invention and therefore are not to be considered limiting of its scope and breadth. In the drawings, some, but not all, possible embodiments are illustrated, and further may not be shown to scale.

The objective of the various embodiments described herein is to improve the spatial sampling of Dual-Sensor seismic data recorded on the bottom of the ocean or other body of water. It is an object of this invention, by means of novel methods and apparatus, to measure pressure, linear particle velocity, pressure gradient, and rotational seismic data on the water bottom. Further, it is an object of this invention to combine these data, by means of novel methods and apparatus, so as to obtain Dual-Sensor seismic data with effective spatial sampling beyond the Nyquist spatial sampling limits of conventional sampling imposed by the physical spacing of the sensor nodes.

The invention includes, among its many aspects and embodiments, a method and apparatus to enhance the spatial sampling of Dual-Sensor seismic data recorded by means of Ocean Bottom Nodes or Ocean Bottom Cables deployed on a water bottom, by utilizing the inventive sensor apparatus. The inventive method and apparatus utilize measurements of pressure, linear particle motion in a nominal vertical direction, pressure gradients in two independent nominally horizontal directions, and rotation measurements around two independent nominally horizontal axes. Further, this method and apparatus comprises: utilizing vertical particle motion and the said two rotational motions to reconstruct vertical particle motion data at a finer spatial sampling; and utilizing pressure and the said horizontal spatial gradients of the pressure to reconstruct pressure data at a finer spatial sampling; both said reconstructions utilizing an Ordinate and Slope signal reconstruction algorithm, or other equivalent algorithms.

FIG. 1 diagrammatically shows the reconstruction of a seismic wavefield utilizing the Ordinate and Slope sampling and data reconstruction technique. The figure shows two example locations 2, 3, from a series of locations along a nominally horizontal x axis 1, on the water bottom, at which we have Ordinate and Slope samples, which are respectively the wavefield values 11, 12 and the spatial gradients 21, 22.

As will be recognized by those skilled in the art, the reconstruction of a wavefield at intermediate points 31 in a horizontal x direction by Ordinate and Slope Sampling is done by means of $sinc^2(x)$ reconstruction functions for the ordinates/values, and $x*sinc^2(x)$ reconstruction functions for the slopes/gradients, with the appropriate scaling for the particular spatial sample interval used in the series of samples. This technique is described, for example, in Bracewell, R., 2000, The Fourier Transform and its Applications, McGraw-Hill, pp. 230-232.

Sample reconstruction at intermediate points by means of Ordinate and Slope Sampling or alternate algorithms may be undertaken on pressure wavefields by measuring the pressure (Ordinate) and the x and y horizontal spatial gradients (Slopes) of pressure.

Sample reconstruction at intermediate points by means of Ordinate and Slope Sampling or alternate algorithms may be undertaken on vertical particle motion wavefields by measuring the vertical linear particle motion (Ordinate) and the rotational motion around x and y horizontal axes (Slopes).

The reconstruction of pressure and vertical particle motion wavefields at intermediate points may be accomplished by any of various well-known algorithms besides the classical Ordinate and Slope sampling described above. Algorithms are available for cases such as irregular spacing, and for situations such as the presence of noise.

It is recognized that because of the gravitational loading of the water layer, the $\sigma_{zz}$ stress component is non-zero at the water bottom, unlike at a free surface:

$\sigma_{zz} \neq 0$ at water bottom

However, those skilled in the art will recognize that for a nominally homogeneous and isotropic earth, the two shear components of the stress tensor in Cartesian coordinates have zero values at a water bottom where the Cartesian axes are chosen such that the z axis is perpendicular to the water bottom and the x, y axes are parallel to the water bottom:

$\sigma_{xz} = \sigma_{yz} = 0$ at water bottom

As will be recognized by those Persons having ordinary skill in the art By, the y component of rotational motion is:

$$\theta_y = \left(-\frac{\partial u_z}{\partial x}\right)$$

Thus the negative of the measured value of the y component of rotational motion, $\theta_y$, is equivalent to the horizontal spatial gradient, or Slope, in the x direction for the vertical particle motion, $u_z$, or Ordinate.

In the present invention the spatial sampling of both the Pressure and the Z-Vertical linear motion components (P-Z) of Dual-Sensor data may be enhanced in one horizontal direction, or in all horizontal directions.

Figure 2:
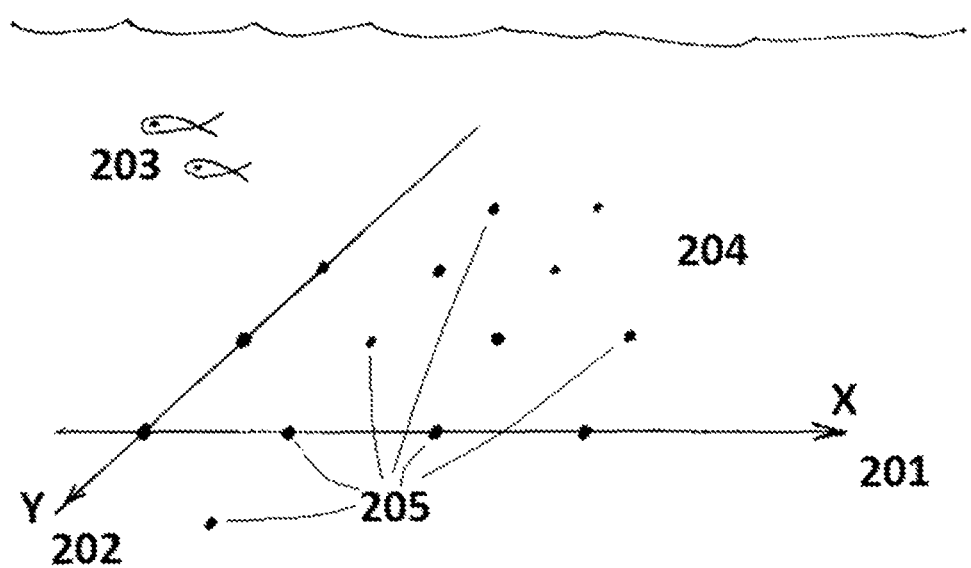
FIG. 2 is a diagrammatic view of the deployment of the inventive sensor apparatuses on the water bottom such as for the enhanced spatial sampling method of the present invention.

FIG. 2 is an isometric view of the horizontal x and y axes, 201 and 202 respectively, on the solid earth water bottom 204 under a water layer 203. It diagrammatically depicts measurements at a series of measurement points on water bottom 204, examples of which are shown 205.

Figure 3A:
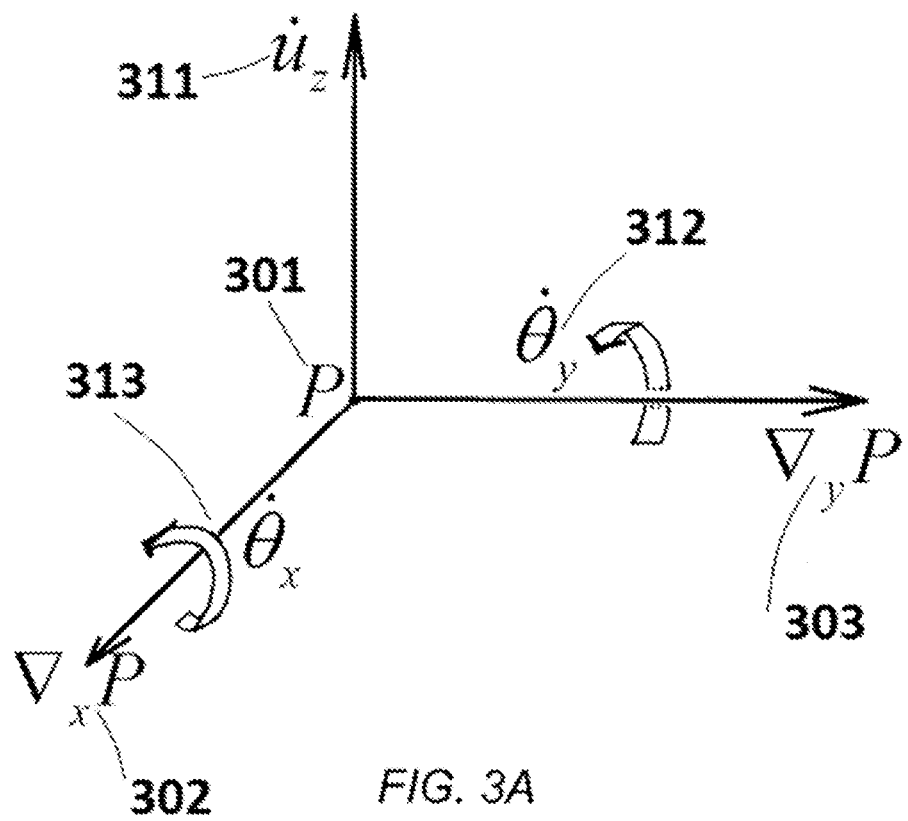
FIGS. 3A and 3B are diagrammatic views of the configuration of sensors in the inventive sensor apparatus on the water bottom such as to depict and enable the enhanced sampling method of the present invention and FIG. 4 is a diagrammatic view of a Reference Surface as a smoothed representation of the water bottom.
Figure 3B:
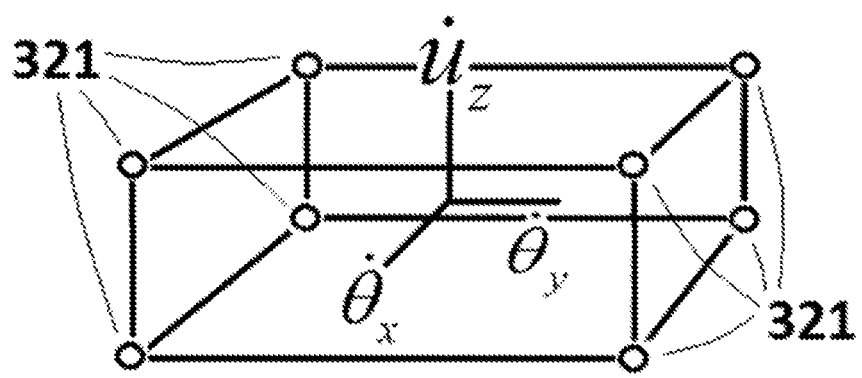

FIGS. 3A and 3B depict some of the components being measured by the inventive sensor apparatus for Dual-Sensor seismic surveying, as deployed on the water bottom 204 at each of the measurement points 205.

FIGS. 3A and 3B depict some of the components being measured by the inventive sensor apparatus for Dual-Sensor seismic surveying, as deployed on water bottom 204 at each of measurement points 205.

In FIG. 3A the Pressure, P, 301 is measured along with the Pressure Gradients in the x and y directions, 302 and 303 respectively, which are understood to be parallel to the shear-stress-free water bottom in this depiction. The vertical particle motion, particularly shown as vertical particle velocity, 311, is measured. Additionally, the rotational angular velocity around the y and x axes, 312 and 313 respectively, are measured to give the horizontal gradient or Slope of the vertical particle velocity in the x and y directions respectively.

In FIG. 3B the Pressure Gradients are measured by means of spatial differences between various combinations of the set of pressure sensors or hydrophones 321. Said set of hydrophones 321 must include at least three hydrophones to measure pressure gradients as differences in two directions parallel to the water bottom. Said set of hydrophones 321 may include any greater number such as the eight shown in FIG. 3B. The configuration in FIG. 3B allows for simple measurement of pressure gradient in three independent spatial directions, with redundant measurements readily possible to improve the quality and accuracy of the measurement.

In one embodiment, consider a Dual-Sensor (P-Z) 3D seismic survey utilizing a grid of Ocean Bottom Nodes with spacings of, say, 400 meters in both x and y orthogonal horizontal directions. Then for each field data record the present invention will yield an effective spatial sampling of 200 meters in both the x and y horizontal directions for both the pressure, P, and the vertical component of particle motion, Z, wavefields.

Figure 4:
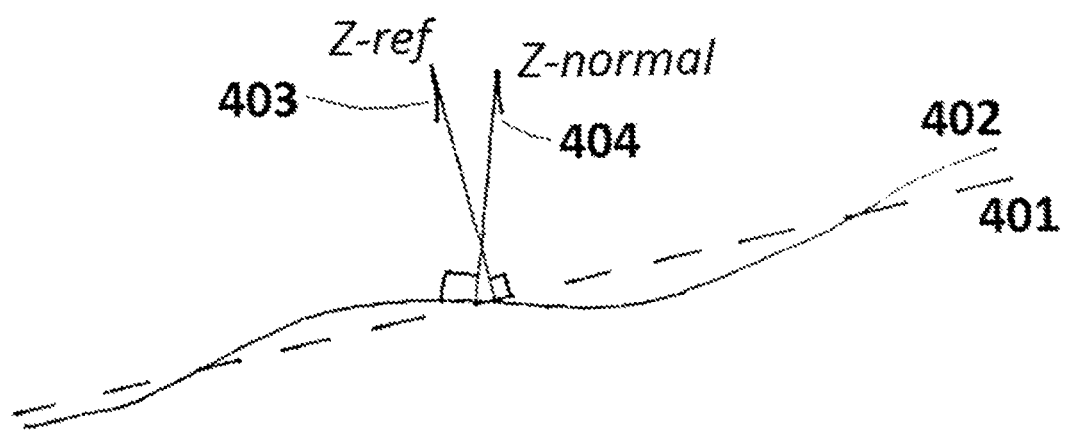

FIG. 4 depicts a Reference Surface 401 and the water bottom 402. Reference surface 401 is a smooth approximation to water bottom 402. It is approximately planar over distances at least as great as the expected wavelengths of the seismic wavefields. The normal 403 that is perpendicular to Reference Surface 401 at the location of a sensor apparatus is an approximation to the normal 404 that is perpendicular to the water bottom. Reference Surface 401 is an approximation to water bottom 402 which is a shear-stress free surface.

In some non-limiting embodiments, azimuth and tilt for static orientation of the sensor apparatus may be measured by devices such as a gyrocompass, and inclinometers or tilt meters.

In some non-limiting embodiments, azimuth may be determined by means of analyzing the amplitudes of multiple components of seismic data for a series of seismic sources at various known locations around the sensor apparatus.

Persons having ordinary skill in the art will recognize that there may be situations where the ocean bottom has irregularities and is tilted. In some non-limiting embodiments, the inventive method is utilized by means of a Reference Surface 401 that is a smooth surface generally conformable to the shear-stress free water bottom 402. As a non-limiting example, Reference Surface 401 may be a tilted planar surface which is an approximate best fit to a generally uniformly sloping water bottom 402.

In some non-limiting embodiments, the sensor apparatuses will be deployed in autonomous Ocean Bottom Nodes.

In some non-limiting embodiments, the sensor apparatuses will be deployed along Ocean Bottom Cables.

In one non-limiting embodiment, thirteen components are measured in a node deployed on the ocean bottom. These include pressure and three spatially independent components of pressure gradient; three spatially independent components of linear particle motion; three spatially independent components of rotational motion; an azimuthal orientation; and static tilt around two spatially independent nominally horizontal axes. In such an embodiment, linear particle motion can be numerically rotated to obtain a component perpendicular to a reference surface. Pressure gradient and rotational motion can be numerically rotated to obtain components for two spatially independent axes that are parallel to a reference surface.

In some non-limiting embodiments, six components are measured in a sensor apparatus deployed on the ocean bottom. These include pressure, two nominally horizontal spatially independent components of pressure gradient; a nominally vertical component of linear particle motion; and two spatially independent components of rotational motion around nominally horizontal axes.

In some non-limiting embodiments, four components are measured in a sensor apparatus deployed in an Ocean Bottom Cable (OBC). These include pressure, a nominally horizontal spatial component of pressure gradient perpendicular to the OBC; a nominally vertical component of linear particle motion; and a component of rotational motion around the nominally horizontal axis along the OBC.

In other non-limiting embodiments, various subsets of measured components between four and thirteen components may be measured by the inventive sensor apparatus, and utilized by the inventive method. In some of these embodiments, approximations may be made for components not measured, such as by means of an assumption that the sensor apparatus is deployed horizontally with no tilt.

In some non-limiting embodiments pressure gradients are measured by a vector hydrophone.

In some non-limiting embodiments pressure gradients are measured by differences between hydrophones deployed in three spatially independent directions.

In many embodiments of the present invention, persons having ordinary skill in the art will recognize that processing of the acquired data may be undertaken in multiple forms. All prior art in signal processing and wavefield processing of seismic data may be utilized as necessary to enhanced desired signals. For example, those skilled in the art will appreciate that signal to noise enhancement processes such as deconvolution, filtering, and imaging in many aspects may be deployed.

A limited number of embodiments have been described herein. Those skilled in the art will recognize other embodiments within the scope of the claims of the present invention.

It is noted that many of the structures, materials, and acts recited herein can be recited as means for performing a function or step for performing a function. Therefore, it should be understood that such language is entitled to cover all such structures, materials, or acts disclosed within this specification and their equivalents, including any matter incorporated by reference.

It is thought that the apparatuses and methods of embodiments described herein will be understood from this specification. While the above description is a complete description of specific embodiments, the above description should not be taken as limiting the scope of the patent as defined by the claims.

Other aspects, advantages, and modifications will be apparent to those of ordinary skill in the art to which the claims pertain. The elements and use of the above-described embodiments can be rearranged and combined in manners other than specifically described above, with any and all permutations within the scope of the disclosure.

Although the above description includes many specific examples, they should not be construed as limiting the scope of the method, but rather as merely providing illustrations of some of the many possible embodiments of this method. The scope of the method should be determined by the appended claims and their legal equivalents, and not by the examples given.

What is claimed is:

1. A method for enhancing the two-dimensional horizontal spatial sampling of dual sensor ocean bottom seismic data on a reference surface, comprising:

positioning at a plurality of locations on the ocean bottom dual sensors for measuring pressure, linear particle motion in a nominal vertical direction, pressure gradients in two independent nominally horizontal directions, and rotation around two independent nominally horizontal axes;

measuring a static orientation of each dual sensor as an azimuthal angle and tilt around two horizontal axes;

measuring linear particle motions along three independent linear axes;

measuring rotational motions around three independent axes;

measuring pressure, and measuring pressure gradients along three independent axes;

numerically rotating in space the linear particle motions, the rotational motions and the pressure gradients to a new set of axes perpendicular and parallel to the reference surface by use of the static orientation measurements;

computationally reconstructing the pressure at intermediate spatial locations on the reference surface by transforming the pressure measurements and the rotated pressure gradients that are parallel to the reference surface, the measurements being made at the sensor locations, to pressure values at a spatial sample spacing of approximately half the physical spacing of the sensors in any two independent directions parallel to the reference surface;

computationally reconstructing the linear particle motion perpendicular to the reference surface at intermediate spatial locations on the reference surface using sample ordinate values and spatial gradient slopes by transforming the statically rotated linear particle motion measurements, and by transforming the statically rotated rotational motion measurements that are parallel to the reference surface, the measurements being made at the sensor locations, whereby the effective spatial sample spacing of the linear particle motion perpendicular to the reference surface is at a spatial sample spacing of approximately half the physical spacing of the sensors in any two independent directions parallel to the reference surface and collecting or obtaining at least one data field record wherein the effective spatial sampling is approximately half the physical spacing of the sensors in at least one horizontal direction.

2. The method of claim 1 wherein the axes are orthogonal Cartesian axes.

3. The method of claim 1 further comprising the use of seven components, the seven components further comprising azimuth, vertical linear particle motion, two horizontal rotational motions, pressure, and two horizontal pressure gradients, in conjunction with an assumption that the sensors are deployed in a nearly flat orientation on the water bottom.

4. The method of claim 1 further comprising the use of six components, the six components further comprising vertical linear particle motion, two horizontal rotational motions, pressure, and two horizontal pressure gradients, in conjunction with an assumption that the sensors are deployed in a nearly flat orientation on the water bottom, and an assumption that azimuth can be determined from seismic data recordings.

5. The method of claim 1 further comprising the use of four components, the four components comprising vertical linear particle motion, horizontal rotational motion around the axis of an ocean bottom cable, pressure, and horizontal pressure gradient perpendicular to the ocean bottom cable, in conjunction with an assumption that the sensors are deployed in a nearly flat orientation on the water bottom.

6. The method of claim 1 wherein the dual sensors are deployed in ocean bottom nodes.

7. The method of claim 1 wherein the rotational measurement is made around three Cartesian axes and the pressure gradient is made along three Cartesian axes, and the horizontal gradient of pressure and horizontal gradient of vertical particle motion are computed so as to compensate for any tilt of the sensors.

8. An ocean bottom seismic sensor apparatus to enhance the two-dimensional horizontal spatial sampling of dual-sensor ocean bottom seismic data comprising:

dual sensors positioned at a plurality of locations on the ocean bottom, the sensors being capable of measuring linear particle motion in a nominal vertical direction, and rotation around two independent nominally horizontal axes to yield horizontal spatial gradients of the vertical particle motion;

the sensors further being capable of measuring pressure, and horizontal pressure gradients in two independent nominally horizontal directions;

a means for computationally reconstructing the pressure and vertical particle velocity wavefields at intermediate horizontal locations by transforming the pressure and vertical particle velocity measurements made at the sensor locations using sample ordinate values and spatial gradient slopes, to pressure and vertical particle velocity measurements at a spatial sample spacing of approximately half the physical spacing of the sensors in any two horizontal directions and a means for collecting or obtaining at least one data field record wherein the effective spatial sampling is half the physical spacing of the sensors in at least one horizontal direction.

9. The apparatus of claim 8 wherein the axes are orthogonal Cartesian axes.

10. The apparatus of claim 8 further comprising the use of seven components, the seven components further comprising azimuth, vertical linear particle motion, two horizontal rotational motions, pressure, and two horizontal pressure gradients, in conjunction with an assumption that the sensors are deployed in a nearly flat orientation on the water bottom.

11. The apparatus of claim 8 further comprising the use of six components, the six components further comprising vertical linear particle motion, two horizontal rotational motions, pressure, and two horizontal pressure gradients, in conjunction with an assumption that the sensors are deployed in a nearly flat orientation on the water bottom, and an assumption that azimuth can be determined from seismic data recordings.

12. The apparatus of claim 8 further comprising the use of four components, the four components comprising vertical linear particle motion, horizontal rotational motion around the axis of an ocean bottom cable, pressure, and horizontal pressure gradient perpendicular to the an ocean bottom cable, in conjunction with an assumption that the sensors are deployed in a nearly flat orientation on the water bottom.

13. The apparatus of claim 8 wherein the dual sensors are deployed in ocean bottom nodes.

14. The apparatus of claim 8 wherein the rotational measurement is made around three Cartesian axes and the pressure gradient is made along three Cartesian axes, and the horizontal gradient of pressure and horizontal gradient of vertical particle motion are computed so as to compensate for any tilt of the sensors.

* * * * *